United States Patent [19]

Kiuchi

[11] Patent Number: 4,735,499

[45] Date of Patent: Apr. 5, 1988

[54] FILM CARRIER SUPPORT MECHANISM FOR FILM PROJECTOR

[75] Inventor: Takao Kiuchi, Tokyo, Japan

[73] Assignee: Fuji Photo Film Co., Ltd., Kanagawa, Japan

[21] Appl. No.: 933,257

[22] Filed: Nov. 20, 1986

Related U.S. Application Data

[63] Continuation of Ser. No. 674,008, Nov. 23, 1984, abandoned.

[30] Foreign Application Priority Data

Nov. 28, 1983 [JP] Japan ................. 58-222266

[51] Int. Cl.$^4$ ............................................. G03B 21/14
[52] U.S. Cl. ........................................ 353/95; 353/27 R; 353/120; 353/119; 353/98
[58] Field of Search ................... 353/74–78, 353/98, 99, 119, 120, 122, 22–27, 95, 97

[56] References Cited

U.S. PATENT DOCUMENTS

| | | | |
|---|---|---|---|
| 2,177,638 | 10/1939 | Draeger | 353/95 X |
| 2,744,444 | 5/1956 | Breitman | 353/119 X |
| 2,782,680 | 2/1957 | Howell | 353/784 |
| 3,164,058 | 1/1965 | Kosowsky | 353/98 X |
| 3,301,128 | 1/1967 | Brandt et al. | 353/96 X |
| 3,720,463 | 3/1973 | Taylor | 353/27 X |
| 3,741,637 | 6/1973 | Katsuragi | 353/120 |
| 3,807,850 | 4/1974 | Ozeki | 353/98 X |

FOREIGN PATENT DOCUMENTS

| | | | |
|---|---|---|---|
| 75767 | 6/1914 | Austria | 353/98 |
| 94878 | 11/1983 | European Pat. Off. | 353/120 |
| 1230050 | 3/1960 | France | 353/119 |
| 430194 | 2/1948 | Italy | 353/26 R |
| 4101 | 2/1972 | Japan | 353/120 |
| 616804 | 1/1949 | United Kingdom | 27 R/ |

Primary Examiner—Harry N. Haroian
Attorney, Agent, or Firm—Birch, Stewart, Kolasch & Birch

[57] ABSTRACT

A film carrier support mechanism for a film projector of the type having an upper cylindrical member for accommodating a light source, and a lower cylindrical member for accommodating an optical arrangement for projection. The light source is adapted to project a picture stored in any of multiple frames of a film. A support member is interposed between the upper and lower bodies for supporting a film carrier, which receives therein a film to be projected, such that the film carrier is movable in a two-dimensional direction in a plane which is perpendicular to the optical axis of the optical arrangement. The support member includes guide elements which cooperate with the film carrier to guide the film carrier in a lengthwise direction of the film, while the film carrier is in a predetermined position with respect to a direction perpendicular to a lengthwise direction thereof.

4 Claims, 8 Drawing Sheets

F I G. 7
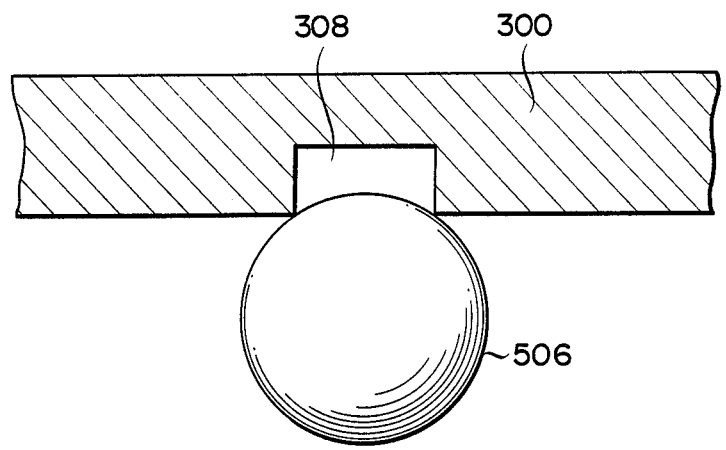
F I G. 8
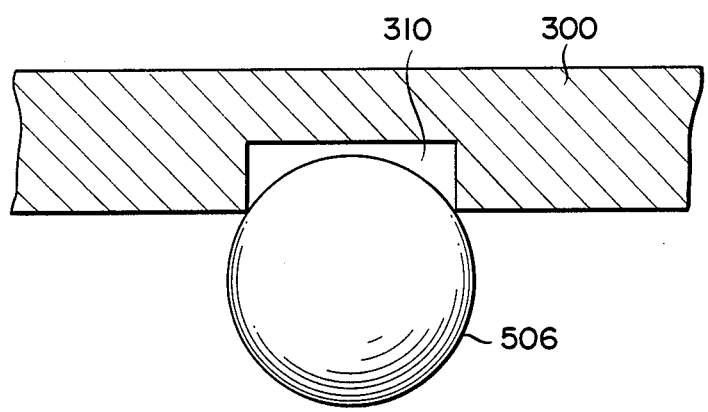

FILM CARRIER SUPPORT MECHANISM FOR FILM PROJECTOR

This application is a continuation of application Ser. No. 674,008, filed on Nov. 23, 1984, now abandoned.

BACKGROUND OF THE INVENTION

1. Field of the Invention

The present invention relates to a film projector for projecting pictures stored in a developed film and, more particularly, to a support mechanism for a film carrier adapted to receive a film in the film projector. The film applicable to the projector has a plurality of frames arranged in series, such as one having a plurality of frames in a continuous strip, or one consisting of an array of discrete frames, or films. Pictures in the film illuminated by the projector may be picked up by a video camera.

2. Description of the Prior Art

A film projector is used for projecting, on a video camera, pictures stored in a film which has been exposed and developed. Each picture projected by the projector is picked up by a video camera so as to be displayed on a display or stored in a recording medium, wuch as a video tape.

Where a film to be projected on a video camera has continuous frames as in ordinary films, it is necessary to take into account the orientation of a picture in a frame which is dependent on the angular position with respect to an optical axis of the image pick up lens of a camera at the time of a shot, i.e., horizontal or vertical. That is, frames in a film are sometimes exposed in a horizontal orientation, and sometimes in a vertical one which is rotated 90 degrees from the horizontal orientation. Furthermore, among the vertical frames, some are the result of rotating the camera clockwise, and some are the result of rotating it counterclockwise.

The video camera, on the other hand, is fixed in place relative to the projector so that pictures are always projected, recorded and reproduced in horizontal frames. Hence, frames exposed by holding a conventional camera, using silver-halide photosensitive film, in a vertical position must be rotated before projected on the video camera.

It is sometimes desired to project only part of a frame in a magnification, instead of one whole frame. For such magnification of specific part of a frame, the film has to be movable in two-dimensional directions in the same plane as the film plane, i.e., a plane which is perpendicular to the optical axis of the projector lens, sliding not only in the lengthwise direction but also in a direction perpendicular thereto.

Generally, a prior art film carrier support mechanism associated with a film projector has given no consideration to magnified projection of desired frame part only. Specifically, a carrier holder for receiving a film carrier has been customarily designed to have substantially the same width as the film carrier, allowing the carrier to be freely slidable only in the lengthwise direction of the film and not in the direction perpendicular thereto. One possible approach for the magnified partial projection may be constructing the carrier to be movable relative to the carrier holder in both the lengthwise direction and a direction perpendicular thereto. Another approach may be mounting the carrier holder, with a substantial play on the projector to make it movable in two-dimensional directions in the same plane as the film plane.

The problem with any of the approaches stated above in conjunction with a prior art mechanism is that, in the event of projection of one whole frame, difficulty is experienced in stopping the film in a predetermined appropriate position with respect to the widthwise direction of the film. Likewise, it is difficult to set a frame precisely in a predetermined vertical position or a horizontal position.

SUMMARY OF THE INVENTION

It is therefore an object of the present invention to eliminate the drawbacks inherent in the prior art technique, and provide a carrier support mechanism which is capable of locating a frame of a film in a desirable manner in an adequate position relative to the optical axis of a projection system, despite any linear or angular motions of a film carrier.

A film carrier support mechanism of the present invention is used with a film projector which comprises an upper body for accommodating a light source for projecting pictures stored in a film having an array of a plurality of frames, and a lower body for accommodating an optical arrangement for projection. A support member is interposed beteen the upper and lower bodies for holding a film carrier, which receives therein a film to be projected, such that the film carrier is movable in a two-dimensional direction in a plane which is substantially perpendicular to an axis of the optical arrangement. The support member includes guide elements which cooperate with the film carrier to guide the film carrier in a lengthwise direction of the film, while the film carrier is in a predetermined position with respect to a direction perpendicular to a lengthwise direction thereof.

BRIEF DESCRIPTION OF THE DRAWINGS

The above and other objects, features and advantages of the present invention will become more apparent from a consideration of the following detailed description taken in conjunction with the accompanying drawings in which:

FIG. 7 is a section along line VII—VII of FIG. 6 showing the film carrier engaged with the projection;

FIG. 8 is a section along line VIII—VIII of FIG. 6; and

DESCRIPTION OF THE PREFERRED EMBODIMENTS

Figure 1:
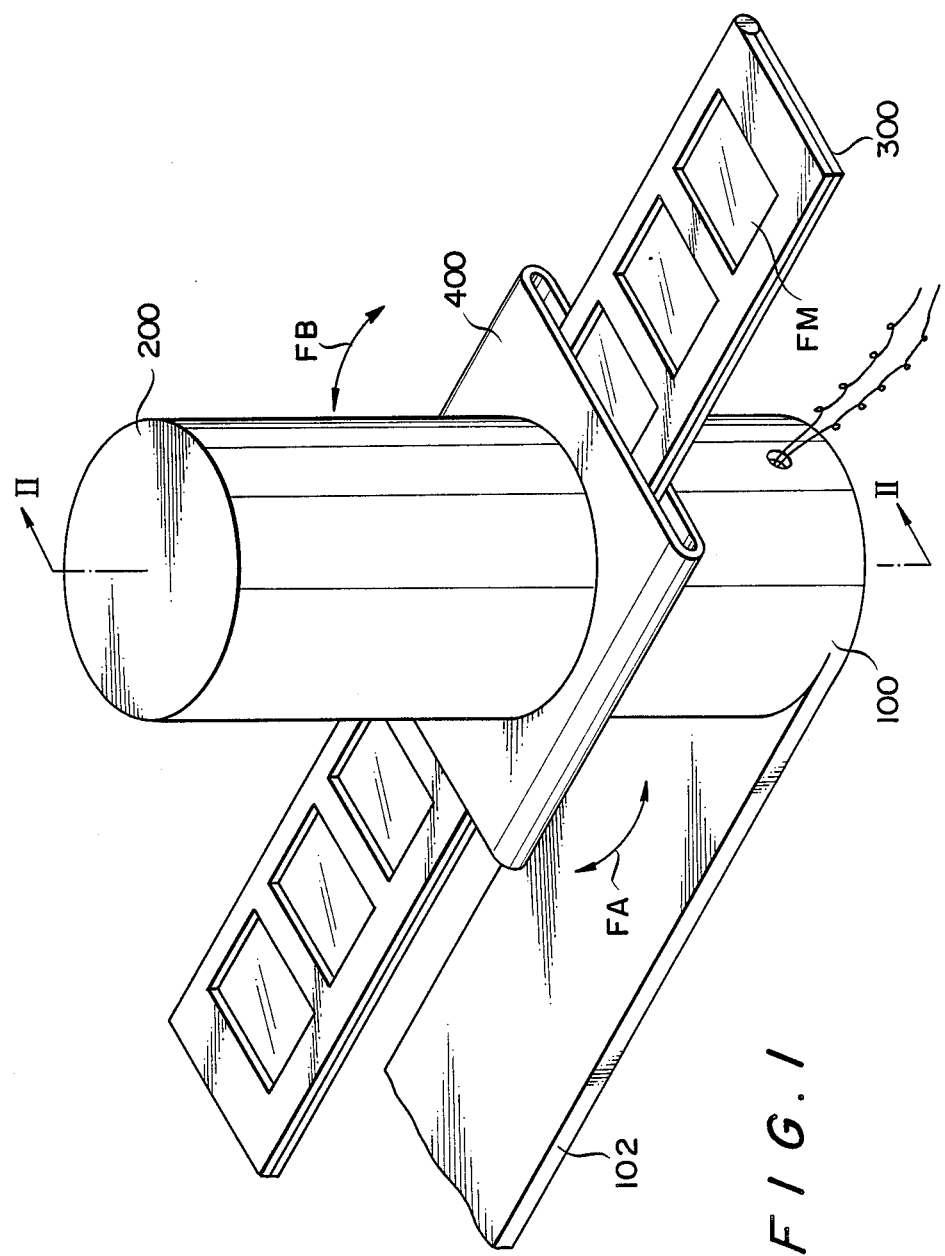
FIG. 1 is a perspective view of a film incorporating a film carrier support mechanism embodying the present invention and shown in an operative position.

Reference will first be made to FIG. 1 for outlining a preferred embodiment of the film carrier support mechanism of the present invention. As shown, the mechanism comprises a lower cylindrical member or body 100, and an upper cylindrical member or body 200 which is mounted on the lower member 100 and rotatable in opposite directions as indicated by arrows FA and FB. The lower cylindrical member 100 stands upright from an end of a base 102 which is adapted to fix thereon an image pickup apparatus, not shown, such as a video camera.

A film carrier 300 is slidably received in a holder 400 which is fixedly mounted on the lower end of the upper cylindrical member, or cylinder, 200. In this construction, the holder 400 and film carrier 300 are rotatable integrally with the upper cylinder 200 in the directions FA and FB.

The upper cylinder 200 accommodates therein a light source, lenses and other elements for illuminating a film FM which is transported by the film carrier 300, as will be described.

The lower cylinder 200, on the other hand, accommodates an optical arrangement including a mirror. Light issuing from the upper cylinder 200 is transmitted through the film FM and, then, steered by the optical arrangement in the cylinder 200 toward the video camera on the base 102.

Figure 2:
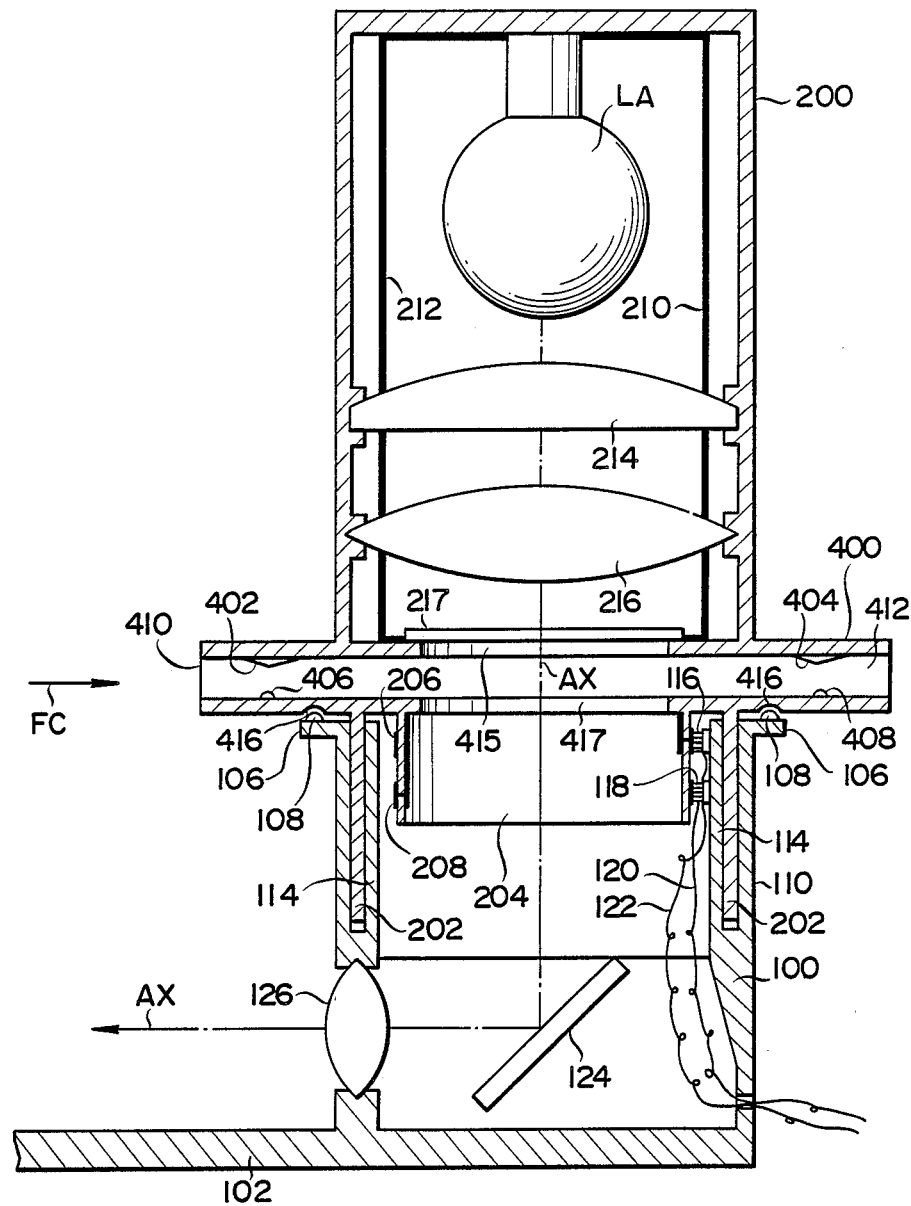
FIG. 2 is a section along line II—II of FIG. 1.
Figure 4:
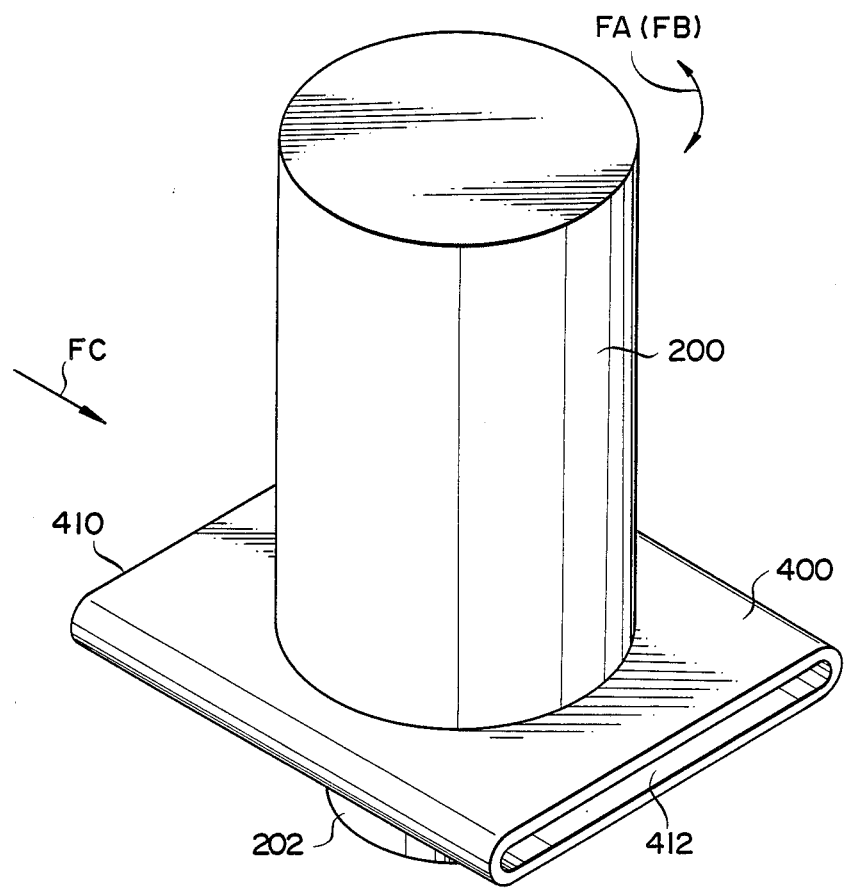
FIG. 4 is a perspective view of an upper cylindrical member also included in the projector of FIG. 1.
Figure 5:
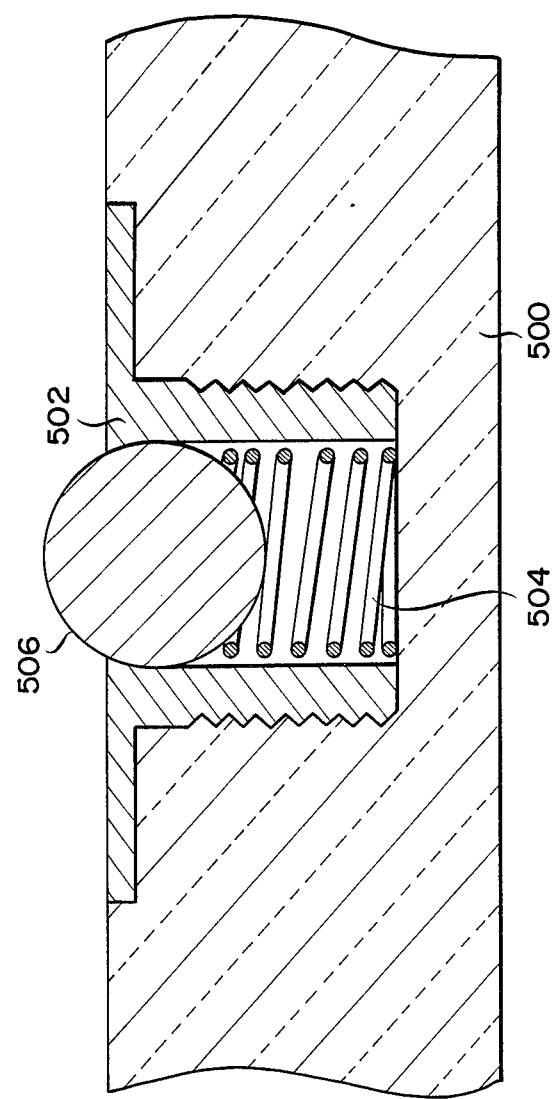
FIG. 5 is a section of an exemplary construction of projections.

The mechanism shown in FIG. 1 will be described in more detail. FIG. 2 is a section along line II—II of FIG. 1, FIG. 3 a view of the lower cylinder 100, and FIG. 4 a view of the upper cylinder 200. As shown, the lower cylinder 100 is formed with an opening 104 at its top, while the edge defining the opening 104 is bent radially outwardly in a generally L-shape to form a flange 106. Projections 108 each having a construction shown in FIG. 5 are positioned on the upper surface of the flange 106 at angular spacings of 90 degrees along the circumference of the flange.

The lower cylinder 100 has an outer wall 110 terminating at the flange 106, and an inner wall 114 surrounded by the outer wall 110 with an annular space 112 defined therebetween. The lower end of the inner wall 114 merges into the outer wall 110.

Brushes 116 and 118 for electrical connection are rigidly mounted in a suitable position on the inner surface of the inner wall 114. Leads 120 and 122 respectively are connected to the brushes 116 and 118 for the supply of power from outside the projector.

A mirror 124 is located in a bottom portion of the lower cylinder 100. An lens 126 is securely held by a lower portion of the outer wall 110 adjacent to the base 102. The arrangement is such that light reflected by the mirror 124 is focused by the lens 126 on the video camera. The optical axis of such a light beam is indicated by a dash-and-dot line in FIG. 2.

Meanwhile, the upper cylinder 200 has the holder 400 in its lower portion. The holder 400 has an annular extension 202 extending from the underside thereof, and another annular extension 204 positioned radially inwardly of the extension 202. The extension 202 is slidably nested in the annular space 112 of the lower cylinder 100, while the extension 204 is provided with annular contacts 206 and 208 on its outer periphery which are held in contact with the brushes 116 and 118, respectively. Conductive strips 210 and 212 extend from the inner periphery of the extension 204 to a light source LA, which is fixed to the top wall of the upper cylinder 200. The contacts 206 and 208 are connected to the conductive strips 210 and 212, respectively. In this construction, power supplied from the outside is routed to the light source LA through the brushes 116 and 118, contacts 206 and 208, and conductive strips 210 and 212.

Located below the light source LA in the upper cylinder 200 are suitable condensing lenses 214 and 216 and a light diffusing plate 217.

The holder 400 has a generally thin and substantially rectangular cross-section. As shown in FIG. 2, the holder 400 is formed with an aperture 415 through its upper wall and an aperture 417 through its lower wall, so that light issuing from the light source LA and having the optical axis AX may be passed therethrough. An end portion of the holder 400 extending to the left in FIG. 2 is provided with compressing springs 402 on the upper surface and projections 406 on the lower surface which face the spring 402, respectively. Likewise, the other end portion of the holder 400 extending to the right in FIG. 2 is provided with compressing springs 404 and projections 408 in coactive positions on the upper and lower surfaces, respectively. Each of the projections 408 is constructed in the manner shown in FIG. 5. Preferably, the projections 406 and 408 have smoothly curved surfaces so as not to scratch the outer surface of the bottom 302 of the film carrier 300. The carrier 300 (see FIG. 1) is inserted into the holder 400 through any one of openings 410 and 412 of the holder 400 as indicated by an arrow FC.

That surface of the holder 400 which faces the flange 106 is formed with an annular groove 416. In the position shown in FIG. 2, the projections 108 on the flange 106 are engaged in the groove 416.

Referring to FIG. 5, a construction commonly applicable to the projection 108, 406 and 408 is shown. A hollow bolt 502 is buried in a base plate 500 to accommodate therein a spring 504 in a compressed state. A spherical member, or ball, 506 is positioned on the spring 504. The inside diameter of the bolt 502 adjacent to the upper end is dimensioned smaller than the diameter of the ball 506. The ball 506, therefore, is constantly urged upwardly by the spring 504 but prevented from jumping out of the bolt 502 while partly protruding from the bolt 502. Although so retained by the bolt 502 and spring 504, the ball 506 is capable of rotating inside the bolt 502.

Figure 6:
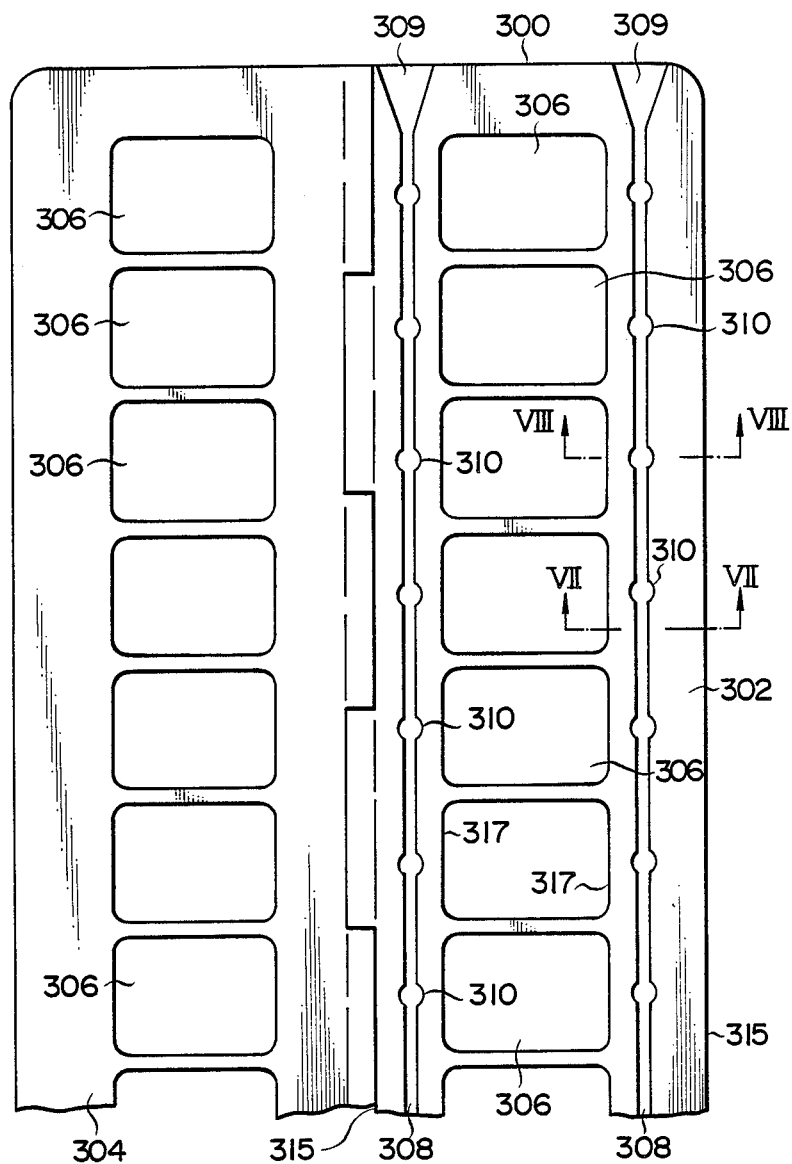
FIG. 6 is a partly taken away plan view of an example of a film carrier.

Details of the film carrier 300 are shown in FIGS. 6-9. In FIG. 6, external surfaces of the carrier 300 which is in a developed position are shown. The carrier 300 has a portion 302 which will constitute a bottom when the carrier 300 is inserted into the holder 400 in the direction FC of FIG. 2, and a portion 304 which will constitute a top, or lid. Each of the bottom portion 302 and the lid portion 304 is formed with an array of windows 306 in correspondence with the frames of a film which they will hold therebetween. On the outer surface of the bottom portion 302, a pair of parallel grooves or recesses 308 extend in the longitudinal direction of the carrier 300 and along the opposite sides of the array of the windows 306. When the carrier 300 is loaded in the holder 400, the projections 406 and 408 of the holder 400 will be received in the grooves 308. The ends 309 of the grooves 308 are enlarged each in a sector to facilitate insertion of the carrier 300 into the holder 400. Each groove 308 is enlarged at predetermined intervals as at 310 in correspondence with the windows 306.

The carrier 300 may be prepared in various sizes to accommodate various dimensions and kinds of films, such as full and half sizes of the 35-millimeter, browny, and type 110 films. The bottom 302 and lid 304 of the carrier 300 are commonly designed with a width which is sufficiently smaller than the width of openings 410 and 412 of the holder 400. As will be described, such allows the carrier 300 inserted into the holder 400 to be freely moved along the width of the latter for magnified projection.

The grooves 308 with the enlarged portions 310 and the projections 406 and 408 cooperate, as will be described hereinafter, when engaged with each other. The ball 506 of a projection 406 or 408 is shown in FIG. 7 in a position engaged in the groove 308 and in FIG. 7 in a position engaged in the enlarged portion 310 of the groove. As shown in FIGS. 7 and 8, the resilient force of the spring 504 (see FIG. 5) causes the ball 506 to move more upwardly when received in the enlarged portion 310 than when received in the groove 308. Therefore, by selecting an adequate relative position between the projections 406 and 408 and the enlarged portions 310, it is possible to click the carrier 300 when the center of one of the windows 306 has aligned with the optical axis AX. Stated another way, while the grooves 308 and projections 406 and 408 cooperate as guide means for feeding the carrier 300 along the holder 400, the enlarged portions 310 and projections 406 and 408 cooperate as a click mechanism for frame feed.

Desirably, any of the carriers 300 associated with various sizes and kinds of films as mentioned should be stopped at a predetermined frame position. Such may be implemented by an arrangement wherein the two projections 406 and 408 are located such that a line extending therethrough intersects the optical axis AX, that is, the projections 406 and 408 face each other with the optical axis AX located at the center therebetween; all the carriers 300 share the same distance between the parallel grooves 308; and the enlarged portions 310 align respectively with the centers of the windows 306 in the lengthwise direction of the carrier 300.

Concerning magnified projection, assume that magnification of one fourth of one entire frame suffices by way of example. Then, in the case of a 35-millimeter, full-size film, it is sufficient that the carrier 300 be displaceable about 6 millimeters, in either widthwise direction from the predetermined position. Each groove 308, therefore, should only be spaced at least about 6 millimeters from an edge 315 of the carrier bottom 302 adjacent thereto and from sides 317 of the windows 306 adjacent thereto which extend along the length of the carrier.

Figure 9:
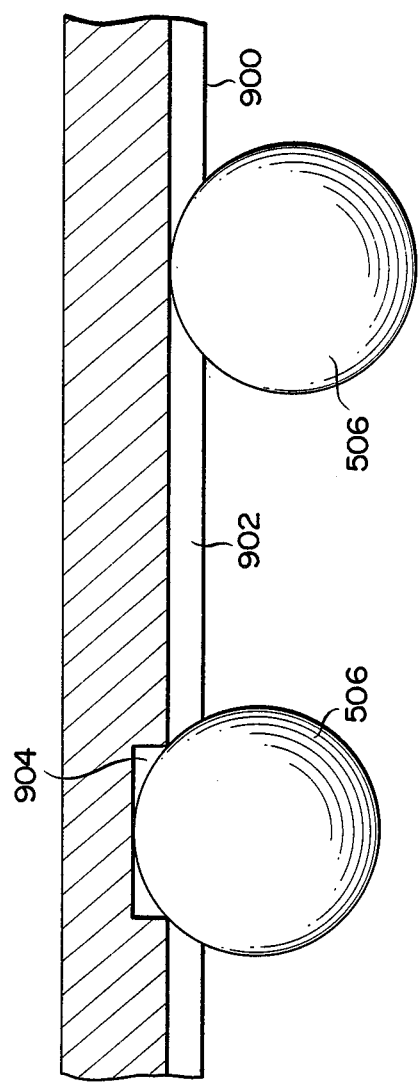
FIG. 9 is a section showing an alternative groove configuration in accordance with the present invention.

In the illustrative embodiment shown in FIGS. 7 and 8, the groove 308 and its enlarged portion 310 have depths which are substantially equal to each other and great enough to keep the ball 506 clear of their bottoms. An alternative to such a configuration is shown in FIG. 9. In the alternative groove configuration, a groove 900 omits the enlarged portions 310, has a greater width than the groove 308 throughout its length, and includes comparatively shallower portions 902 and comparatively deeper portions 904 which are dimensioned to cause the ball 506 to be in constant contact with their bottoms.

The principles described above in conjunction with the groove 308 (900) similarly apply to the annular groove 416, which is formed in the flange 106. The groove 416 is enlarged at equal intervals of 90 degrees along the circumference of the flange 106. Coacting with the projections 108, the groove 416 generates a click motion at every 90 degrees angular movement of the upper cylinder 200. This allows the film FM to click to any desired position in the direction FA or FB. Particularly, the balls 506 constituting the projections 108 serve to support the upper cylinder 200 and, thereby, render the upper cylinder 200 smoothly rotatable. That is, three different functions are attained at a time: guiding function implemented by the groove 416 and the projections 108 for the rotation of the upper cylinder 200, clicking function implemented by the enlarged groove portions and the projections 108 for the rotation, and bearing function implemented by the balls 506 of the projections 108.

Figure 3:
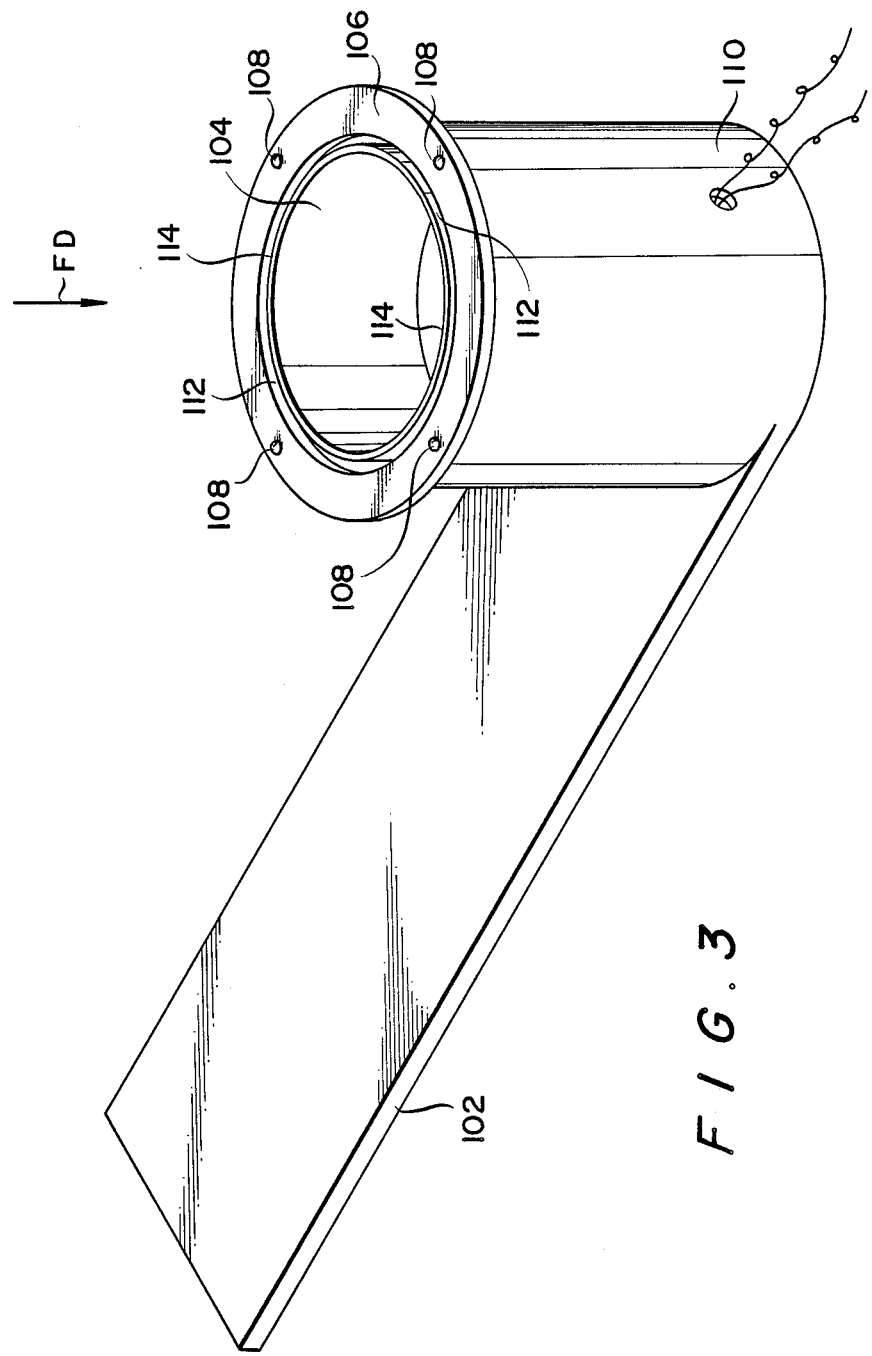
FIG. 3 is a perspective view of a lower cylindrical member included in the projector of FIG. 1.

In operation, the upper cylinder 200 is mounted on the lower cylinder 100 in a direction indicated by an arrow FD in FIG. 3, causing the brushes 116 and 118 to come into contact with the electrodes 206 and 208, respectively. In this position, the projector is ready to have its light source LA powered from an external power source. Although not shown, switching means is manipulatable to selectively turn on the light source LA. Since the contacts 206 and 208 are provided on the outer periphery of the extension 204 of the holder 400 each in an annular configuration as previously stated, the power supply to the light source LA is constantly secured despite the rotation of the upper cylinder 200 the direction and angle of which is arbitrary.

Thereafter, the carrier 300 holding the film FM thereinside therein is inserted into the holder 400, see FIG. 1. The carrier 300 is compressed by the springs 402 and 404 downwardly in FIG. 2, while the balls 506 are received in the grooves 308. Then, the operator may slide the carrier 300 in and along the holder 400, and in a clicking mode set up by the enlarged groove portions 310 and the projections 406, selecting a desired frame for projection.

The picture in the selected frame is illuminated by the light source LA to be projected on the video camera via the optical elements such as the mirror 124. The operator, watching a picture on a display, rotates the upper cylinder 200 relative to the lower cylinder 100 to a position conforming to a particular orientation of the picture which is dependent upon a camera position at the time of a shot, i.e. horizontal or vertical. An angle of rotation adequate for the projection of a vertical orientation is ±90 degrees with respect to the horizontal orientation. The correct position, whether it be horizontal or vertical, can be seen with the help of the click motions provided by the groove 416 and the projections 108. The guide attained with the groove 416 and the bearing attained with the projections 108 promote smooth rotation of the upper cylinder 200. The power supply to the light source LA from the outside does not rely on a cord and, therefore, various undesirable occurrences due to rotation are eliminated such as causing the cord to touch the carrier 300 and twisting of the cord. The upper cylinder 200 is rotatable in any desired direction, and may even be rotated in only one direction continuously.

Nevertheless, in accordance with the present invention, the power supply to the light source LA may be implemented by a cord connecting to the upper cylinder, instead of the brushes described above. Although the cord would prevent the upper cylinder 200 from being freely rotated in the previously stated manner, the film holder could be rotated over a sufficient angular range for the projection of pictures shot in vertical positions which are angled ±90 degrees relative to those shot in horizontal positions.

Further, desired part of a frame may be projected in a magnification by sliding the carrier 300 within the holder 400 until the center of the desired part aligns with the optical axis AX.

As described above, a carrier support mechanism in accordance with the present invention allows a film carrier to be inserted into a holder, provides them with a click mechanism for defining a proper position of a frame, and makes the holder bodily rotatable. Such a construction is effective to precisely locate a frame of a film in an optimum position relative to an optical axis of an optical system. In addition, one may readily move the frames or effect magnified projection merely by freeing the carrier from the click mechanism by easy manipulation.

Various modifications will become possible for those skilled in the art after receiving the teachings of the present disclosure without departing from the scope thereof.

What is claimed is:

1. A film carrier support mechanism for use with a film projector which includes an upper body for accommodating a light source for projecting pictures stored in a film having an array of a plurality of frames, and a lower body for accommodating an optical arrangement for projection, comprising:

support means, coupling said upper and lower bodies, for holding a film carrier which receives therein a film to be projected, said film carrier being movable in two dimensions within a plane which is substantially perpendicular to an optical axis of said optical arrangement;

said support means including guide means cooperative with said film carrier for normally keeping said film carrier in a predetermined position with respect to a direction perpendicular to a lengthwise direction of the film and for guiding said film carrier in the lengthwise direction;

said guide means being freed upon a force being applied to said film carrier to cause said film carrier to move perpendicularly to the lengthwise direction of the film within the plane so as to bring a portin of a frame carried on the film other than the center of the frame to the optical axis of said optical arrangement.

2. A film carrier support mechanism in accordance with claim 1, wherein the guide means comprises means for halting a movement of the film carrier at a predetermined frame position of the film.

3. A film carrier support mechanism in accordance with claim 1, wherein the support means is integrally connected to the upper body, and rotatable about the optical axis of the optical arrangement in a plane which is substantially perpendicular to the optical axis.

4. A film carrier support mechanism in accordance with claim 1, wherein said guide means include projecting members positioned on an inner surface of said support means, said projecting members being engagable with grooves formed in the rear surface of said film carrier for maintaining said film carrier in a predetermined orientation with said support means.

* * * * *